(12) United States Patent
Jacobson

(10) Patent No.: US 7,074,043 B1
(45) Date of Patent: Jul. 11, 2006

(54) MOBILE FIREFIGHTING FLASHOVER TRAINING UNIT AND ARSON INVESTIGATION LAB & METHOD OF FABRICATING SAME

(76) Inventor: Damon Jacobson, 902 S. 7th St., Phoenix, AZ (US) 85034

( * ) Notice: Subject to any disclaimer, the term of this patent is extended or adjusted under 35 U.S.C. 154(b) by 0 days.

(21) Appl. No.: 10/863,997

(22) Filed: Jun. 8, 2004

Related U.S. Application Data

(60) Provisional application No. 60/533,602, filed on Dec. 30, 2003.

(51) Int. Cl.
*G09B 19/00* (2006.01)

(52) U.S. Cl. ........................ 434/226; 434/219
(58) Field of Classification Search ............... 434/236, 434/219; 220/1.5; 52/64, 65, 238.1
See application file for complete search history.

(56) References Cited

U.S. PATENT DOCUMENTS

| | | | |
|---|---|---|---|
| 3,784,054 A * | 1/1974 | Mautz | 220/534 |
| 3,928,708 A * | 12/1975 | Fohlen et al. | 428/412 |
| 4,067,165 A * | 1/1978 | Timmons | 52/585.1 |
| 4,526,548 A | 7/1985 | Livingston | |
| 5,173,052 A * | 12/1992 | Duncan, Jr. | 434/226 |
| H01134 H * | 2/1993 | Meadows et al. | 434/226 |
| 5,203,707 A * | 4/1993 | Musto et al. | 434/226 |
| 5,230,954 A * | 7/1993 | Sakamoto et al. | 428/332 |
| 5,316,484 A * | 5/1994 | Layton et al. | 434/226 |
| 5,688,136 A | 11/1997 | Rogers et al. | |
| 5,752,835 A | 5/1998 | Whitmer, Sr. | |
| 5,906,493 A * | 5/1999 | Bishop | 434/226 |
| 5,927,990 A * | 7/1999 | Welch et al. | 434/226 |
| 5,950,373 A * | 9/1999 | von Hoff et al. | 52/79.5 |
| 6,179,620 B1 * | 1/2001 | Schmid | 434/226 |
| 6,889,473 B1 * | 5/2005 | Westra | 52/64 |
| 2003/0198923 A1 * | 10/2003 | Westra | 434/226 |

FOREIGN PATENT DOCUMENTS

GB     2339955 A  *  2/2000
JP     02052736 A  *  2/1990

OTHER PUBLICATIONS

Training Forum from VolunteerFD.org, Nov. 21, 2002.*

* cited by examiner

*Primary Examiner*—Dmitry Suhol
(74) *Attorney, Agent, or Firm*—Gregory J. Nelson

(57) ABSTRACT

A firefighting training unit and a method of fabrication such a unit. The fabrication involves modifying an existing structure such as a steel cargo container. The modification procedures first require that combustibles be removed and a steel floor welded in place of the existing wood floor. Viewing ports and access doors are provided in the sidewalls. Roof ventilation vents are cut in the roof and the opening controlled by a hinged hatch. The units are economical, mobile and may be used for both fire training and forensic investigation.

9 Claims, 3 Drawing Sheets

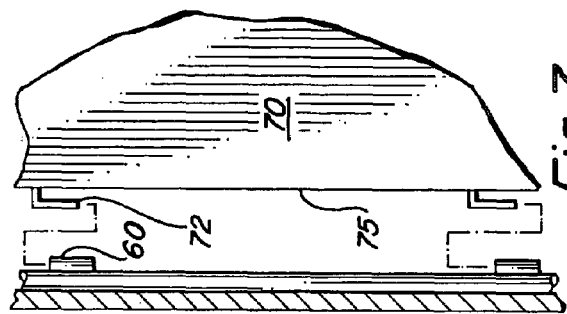
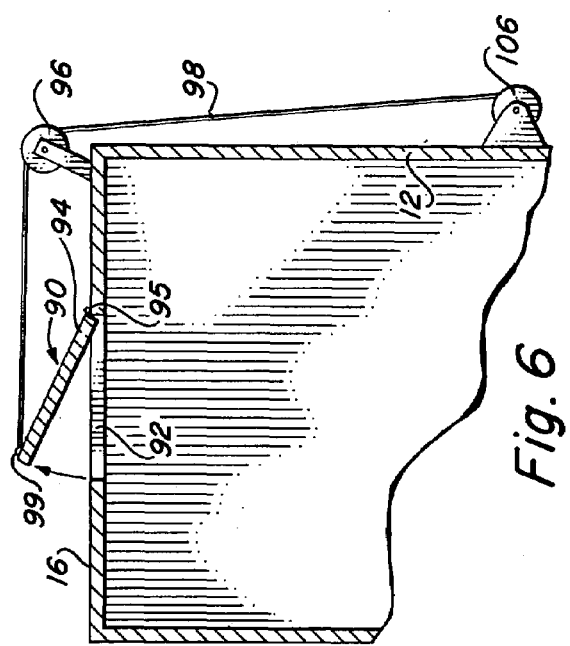
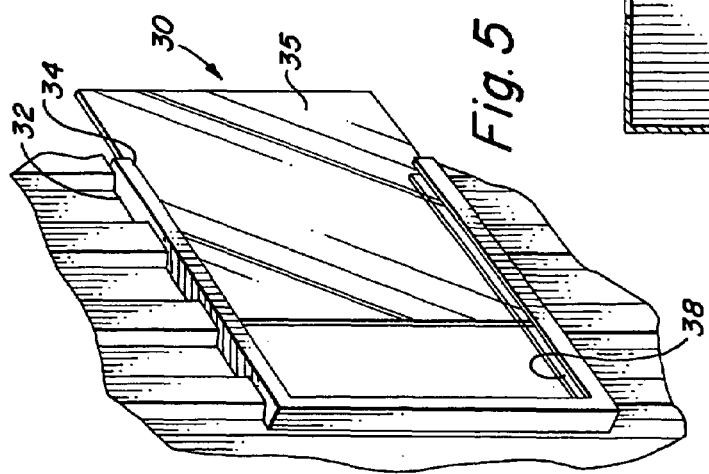
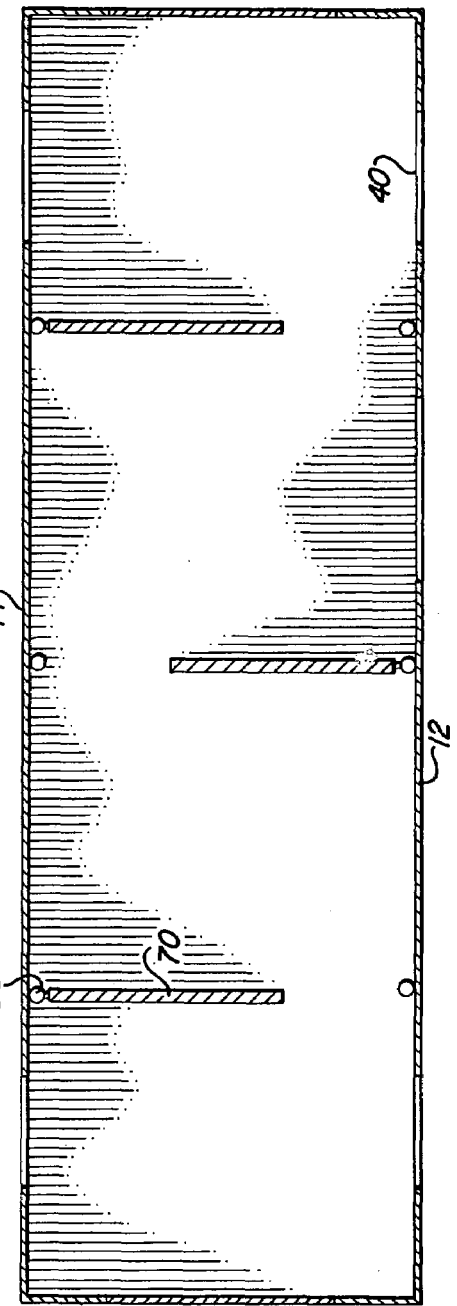

MOBILE FIREFIGHTING FLASHOVER TRAINING UNIT AND ARSON INVESTIGATION LAB & METHOD OF FABRICATING SAME

CROSS REFERENCE TO RELATED APPLICATION

This application is based on U.S. Provisional Patent Application Ser. No. 60/533,602, filed Dec. 30, 2003, of the same title.

FIELD OF THE INVENTION

The present invention relates to a firefighting training and forensic/arson investigation facility and more particularly relates to the fabrication of a relatively inexpensive mobile fire fighter training unit arson investigation lab fabricated by modifying an existing structure such as a cargo container.

BACKGROUND OF THE INVENTION

The training of firefighters, both in the techniques of properly fighting and extinguishing fires, and in the forensic determination of the cause of a fire conventionally involves the use of live fire burn rooms.

One common type of firefighter training facility is a permanent tower which has several floors each floor having one or more rooms which may be provided with some insulation. Such towers are generally masonry structures and may be equipped with various means for generating fire and smoke to provide a realistic environment for training firefighters. These towers allow the firefighters to experience different types of fires within a building structure in order to learn the proper fire fighting techniques. While such towers are effective, they are expensive to construct and have the disadvantage of being permanently located in a fixed position. Such towers are not portable and cannot be moved to various locations for training firefighters in different areas.

As a result of these disadvantages, portable or mobile firefighting training units have been developed. Generally, these training units are trailerable and have a plurality of rooms or areas having fire source devices to generate flames, smoke and heat to provide a realistic firefighter training environment.

For example, U.S. Pat. No. 4,526,548 discloses a mobile firefighting training trailer which is divided into a plurality of rooms or passages. A plurality of simulated appliances and furniture pieces are located in the various rooms. A smoke generator is located in a separate equipment room and the unit is capable of selectively supplying smoke to desired locations in the trailer. Flame generating devices are associated with the simulated appliances and furniture pieces. The generated flames are extinguished by proper application of water and other extinguishing agents. A ventilation system and sprinkler system are provided for the safety of the trainees.

U.S. Pat. No. 5,752,835 shows a mobile firefighting training facility that can be transported to a training site to realistically simulate an actual fire. The firefighting training facility has a mobile housing with a plurality of exterior walls, an interior chamber, fire-generating means coupled with the housing for generating a fire in the interior chamber of the housing. Foldable extension panels are attached and the building exterior and each panel resembles a portion of the exterior or facade of a building such as a house. The foldable panels are shiftable between folded or transport positions wherein the panels overly a portion of the exterior walls of the housing and extended use positions wherein the panels are positioned adjacent to and substantially co-planar with one of the exterior walls of the housing.

U.S. Pat. No. 5,203,707 shows a modular firefighting trainer which includes at least one simulated module having a training room with one or more simulated burnable items and having an equipment room with a burner control and a smoke generator. A second control subassembly has a control room with a control panel connecting to the burner control and the smoke generator. A third interconnected assembly has a hallway connecting to the training room and having an exterior doorway.

In addition to the modular, mobile firefighting training units described above, the prior art discloses specialized fire trainers such as shown in U.S. Pat. No. 5,688,136. This patent shows a mock-up aircraft for use in training firefighters and passenger rescuers during simulated aircraft cabin fires.

Thus, while the training units described above represent a less expensive, portable approach to providing firefighting training facilities, there nevertheless exists the need for inexpensive mobile units which can easily be configured to the requirements of the user and which can be utilized both for firefighting training and for forensic arson investigation.

BRIEF SUMMARY OF THE INVENTION

Briefly, the present invention provides an improved and economical mobile firefighting training facility and a method of fabricating such facility by modifying existing cargo containers such as standard cargo containers as the type used for freight both for ocean and land transportation.

The present invention relates to modification of such a steel container converting the container into live firefighting training and forensic units. In the conversion, combustibles, such as any wooden flooring or other flammable materials, are first removed and replaced with heavy gauge steel plate. Viewing and filming windows or ports are installed at selected locations in the sidewalls of the cargo container. The viewing windows include a frame which consists of a U-shaped channel which receives a slidable window of the type such as a heat-resistant ceramic glass. The interior surfaces of the container are lined with protective, flame-resistant tiles. For forensic units, generally the entire interior of the unit is lined, whereas for firefighting training generally only approximately one-half of the length of the interior of the container is lined with tiles to establish a burn chamber.

Steel posts may be welded at selected locations along the sidewalls and extend vertically along the interior sidewalls. The posts have spaced-apart eyelets or sleeves which will align with cooperating L-shaped hooks on wall panels. The wall panels are provided in different sizes and dimensions so that the interior of the container may be configured or partitioned into a plurality of rooms or areas of different sizes and shapes to assist in training firefighters. The standard cargo container is provided with large doors at opposite ends for convenient access to the interior of the container for personnel, equipment and panels.

In addition to viewing windows, one or more ventilation hatches are provided in the upper surface of the container. The hatches include a heavy, hinged door which may be selectively opened to provide the desired amount of ventilation. The door is connected to a cable which rides over a pulley and extends downwardly along a side of the container to a manually operable winch which may be operated to open or close the hatch door.

In addition, the container can be modified to include adaptors for connection to a fuel source such as a propane gas system. The user can then connect the outlet of the adapter to gas lines within the interior of the container which gas lines have outlets at selected locations to generate flame and smoke to create the desired condition such as would occur with a Class A, B or C fire.

BRIEF DESCRIPTION OF THE DRAWINGS

The above and other advantages and objects of the present invention will become more apparent from the following description, claims and drawings in which:

FIG. 4 is a sectional view of the interior of a fire training unit subdivided into rooms or areas to replicate various fire conditions;

FIG. 5 is a detail view of a representative viewing and filming port that may be installed in the sidewalls of the container;

FIG. 6 is a view illustrating the construction of the hatch and attached winch for providing interior ventilation;

FIG. 7 is a detail view showing the interior posts and a removable panel for selectively configuring the interior burn room; and FIG. 8 is a sectional view showing the attachment of the tile liners to the interior sidewalls.

DETAILED DESCRIPTION OF THE DRAWINGS

The present invention provides a new and improved firefighting training facility which is fabricated by modification of an existing structure such as a cargo container. The use of a cargo container as the base structure greatly reduces the cost of fire training units. This is because cargo containers are readily available and, in many cases, can be purchased in used condition and then modified. Further, a number of sources for cargo containers are available and the manufacturers of these type of units are located throughout the country. Thus, both the competitive market forces and efficiencies that come with established manufacturing procedures result in such cargo structures being relatively inexpensive as compared with fabricating a modular firefighting unit structure from the ground up.

Generally cargo containers are manufactured in standard sizes with 20 ft and 40 ft lengths being standard. Such containers have a width of approximately 8 ft and a height of about 8' 6" with door openings at both ends. The door openings generally are about 7 ft 8 inches in width and 7 ft 5 inches in height so as to provide adequate room for ingress and egress of firefighting personnel and equipment and for loading test items. A typical cargo container has sidewalls of 16 gauge, seam-welded steel. The roof is also 16 gauge seam-welded steel. The bottom frame has typical steel channels, as are cross member framing.

Figure 1:
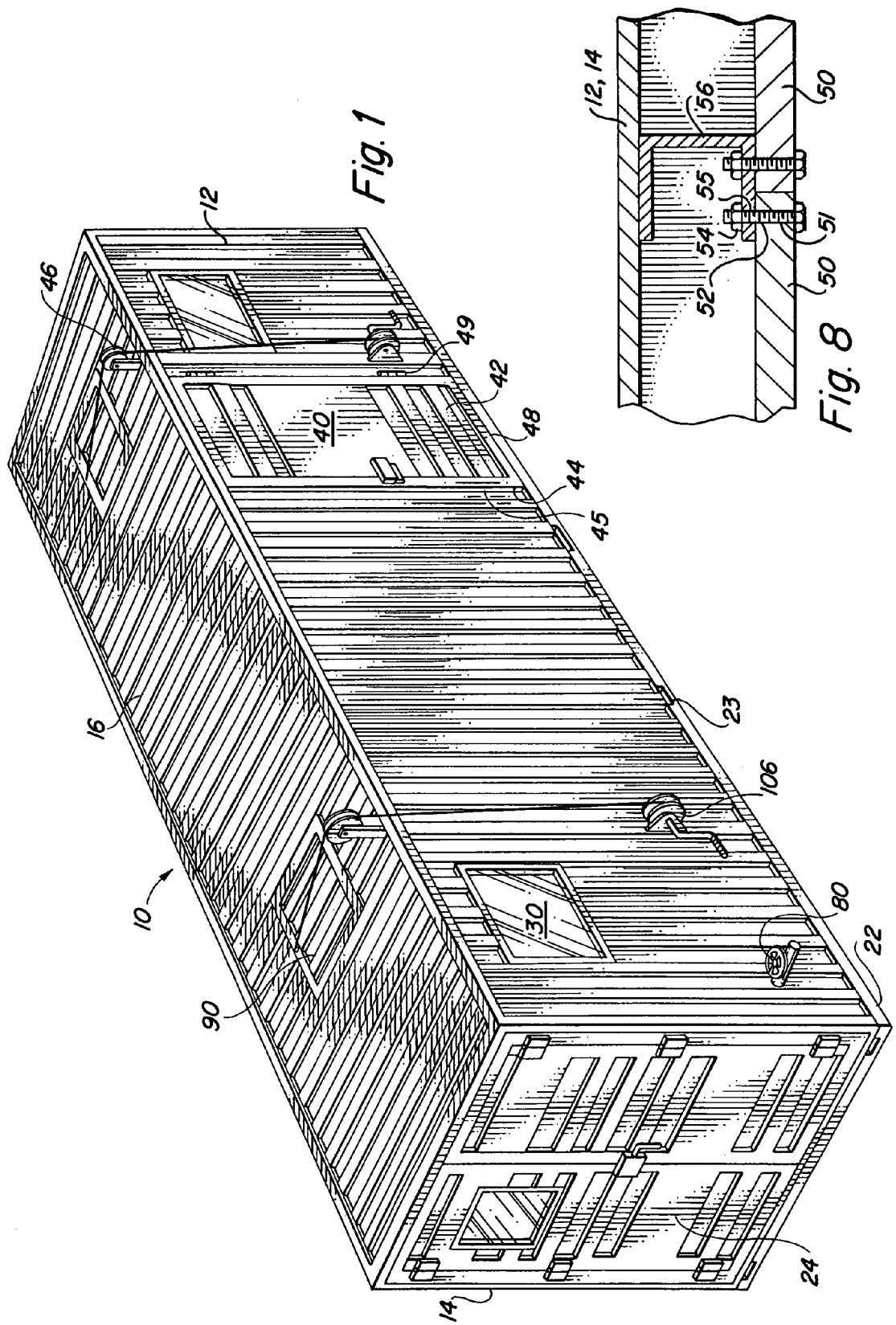
FIG. 1 is an exterior perspective view representative of live firefighting training unit.
Figure 2:
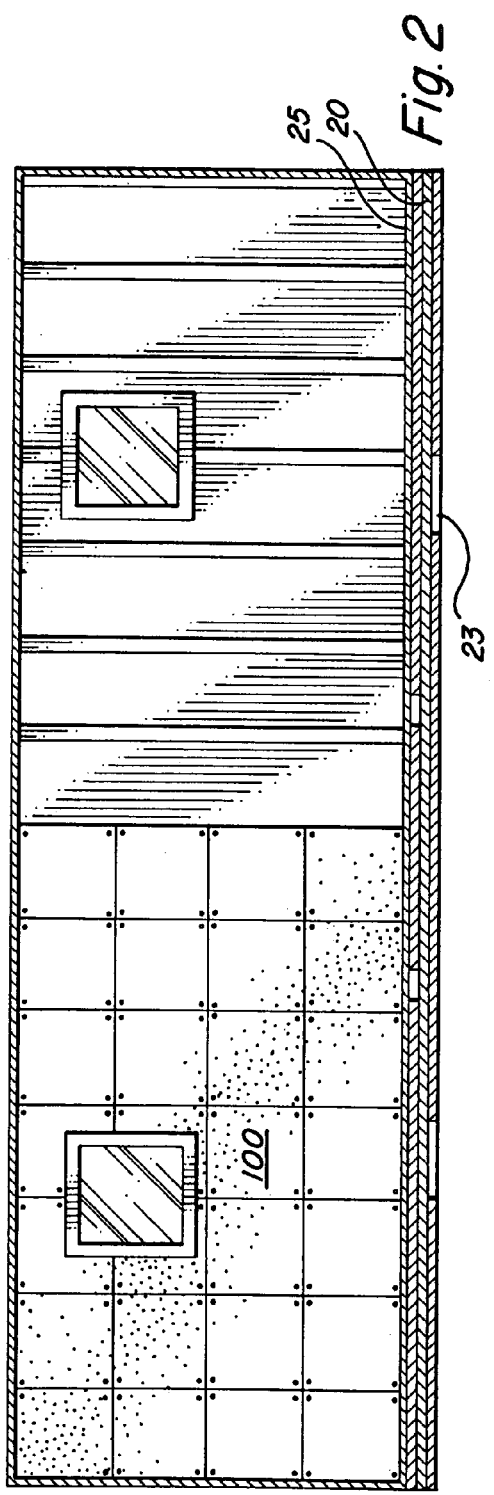
FIG. 2 is sectional view of a live fire training unit configured for firefighting training.

Turning now to the drawings, FIG. 1 shows the exterior of a representative cargo container of the type described above which may be converted to a firefighting training unit. The cargo container is generally designated by the numeral 10 and has opposite sidewalls 12 and 14, a roof 16 and a steel floor 20 supported on longitudinally extending beams 22 having openings 23 for a fork lift. The container is welded steel construction. Hinged doors 24 are provided at the ends of the container, as described above.

The initial fabrication step in the conversion of a cargo container to a firefighting unit first involves removal of any burnable or combustible materials. Many existing storage containers are provided with an interior floor generally a hard wood or treated wood. This material must first be removed and replaced with an interior floor 25 of steel plate such as 14 gauge steel plate which is welded in place. Once this has been accomplished, the cargo container can be converted into either a firefighting training unit or a forensic or arson investigating unit. Live fire units are used for training the technique of combating fires and these units allow firefighters to view fires and apply extinguishing agents in conditions that replicate actual conditions. A forensic unit is used to replicate burn conditions for testing, researching and developing data by matching fire conditions and controlling fire variables.

In the conversion of a cargo container to a mobile firefighting training unit, the container will be modified as shown in FIG. 5. Once an interior steel floor 25 has been installed, viewing and filming windows or ports 30 are provided at selected locations along the sidewalls, depending upon the requirements of the user. Windows 30 are installed by cutting apertures or openings 32 into the sidewall at selected locations. Typically the size of the viewing windows are approximately 20" by 26". Once the openings have been formed by a suitable cutting tool, such as a cutting torch, a frame 34 is positioned in the openings. The frame consists of a generally U-shaped channel 36 of steel having dimensions to conform to the size of the opening. The channel is welded to the sidewall extending around the opening or aperture.

As seen in FIG. 5, the channel has a groove 38 which extends around the inner surface of the channel and receives a transparent viewing window panel 35. The viewing and filming window panel 35 is slidably received within the groove 38 in the channel so that it may be opened or closed as required. The material of the viewing window 35 is a ceramic glass such as the material sold under the designation Neo Ceram®. The windows or ports may be located as required and provide locations for observation as well as for filming for later instructional use.

If desired by the user, additional access opens such as doors 40 in the sidewalls can be provided. Accordingly, access openings 45 may be cut into sidewalls 12, 14 generally extending substantially the full height of the container, having a width of 2 to 4 ft. A door panel 42 of steel, such as 14 gauge steel, having opposite sides 44, top 46 and bottom 48 is dimensioned to cover the access opening. The door is secured to the sidewall by one or more hinges 49 located on the door sides 44 and welded to the container sidewalls.

Figure 3:
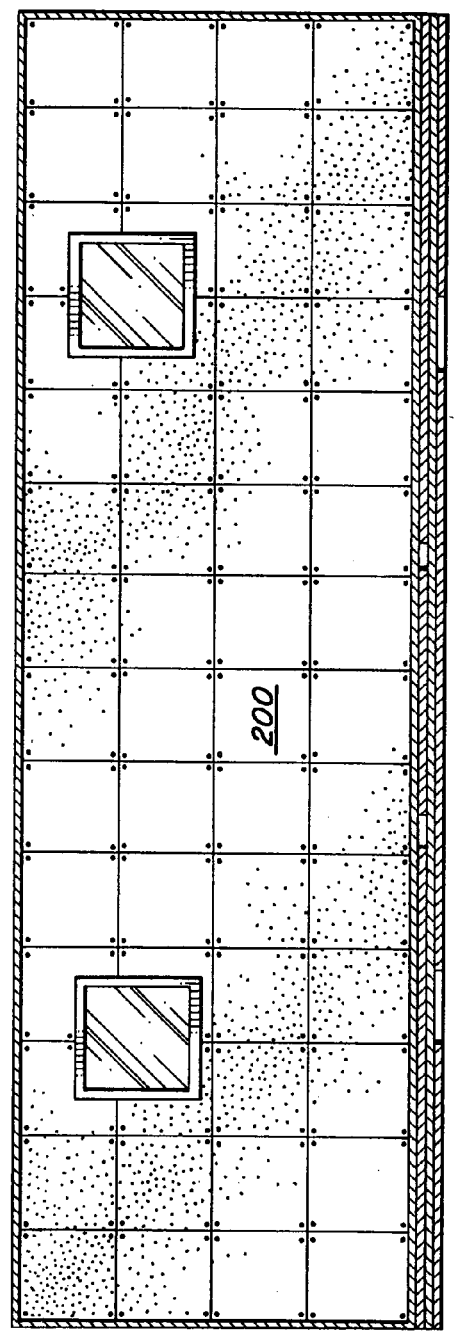
FIG. 3 is a sectional view of the interior of a live fire training unit configured for forensic training.

The interior of the fire training unit is completed by applying a ceramic lining to part or all of the interior, floor, sidewalls and interior ceiling surfaces. For most firefighting training applications, fireproof tiles designed to withstand extreme stress when water or extinguishing agents are applied to the surfaces in approximately one half of the container interior length. This area defines a burn chamber 100 as seen in FIG. 3. If the unit is intended for forensic purposes, the entire interior is generally lined with tile to establish a full length chamber 200 as seen in FIG. 3. Representative tiles are of the type designated by the mark Marinite®. The tiles provide a durable, heat resistant interior surface which imposes fewer limitations on fires, quenching and drying. FIG. 8 illustrates the installation of the tiles 50 which are drilled at 51 to receive stainless steel bolts 52 carrying washers and nuts 54. The bolts extend through the tiles into apertures 55 in spaced-apart steel channels 56 which are welded to the interior of the sidewalls 12, 14.

Referring to FIGS. 4 and 7, the modification of the containers into a fire training unit involves securing vertically extending steel posts 60 at selected locations along the sidewall. Again the particular location of the steel posts 60 will depend, to some extent, upon the requirements of the user. The steel posts 60 are each provided with a pair of spaced-apart sleeves 62. The user may then secure internal panels 70 to the posts to simulate room areas that may be encountered in fighting fire. For example, the panel 70 may be a steel panel which extends the entire height of the interior of the unit and have a width of only 4 ft. The partitions may be variously shaped and dimensioned and are secured by engaging the L-shaped hooks 72 on one side 75 of the panel within the sleeves 62 on the steel posts 60. In this way, the panels can easily be removed and replaced to facilitate configuring the interior of the fire unit. The large end door accommodates installation of the panels in various configurations to replicate building room interiors.

If the user wishes to equip the training unit with means for producing flames, an adaptor 80 may be secured to one of the sidewalls 12, 14 of the container at one or more selected locations as seen in FIG. 1. The adaptor is of the type for connection to a source of fuel such as propane. A control valve, not shown, will be associated with the fuel source. The outlet of the adaptor is located in the interior of the container and may be coupled to a gas pipe which may be routed within the interior of the container having a burner which may allows the gas to be ignited to produce flame and smoke. Various types of burners and ignition systems are known to those skilled in the art to provide conditions existing in different types of fires such as Class A, B or C. Smoke generators are also known and reference is made to U.S. Pat. No. 5,320,536 showing one such type of smoke generator.

Ventilation of the interior of the container is provided by one or more hatches 90 located in the roof of the container. The flexible ventilation design allows the user to control the fire that has been ignited within the container. Referring to FIG. 6, the hatch assembly consists of an opening 92 of selected size in the roof 16 generally about 3 ft. by 3 ft. A steel door 94 extends over the opening and is hinged to the roof at spaced-apart hinges 95. A pulley 96 is disposed on the roof adjacent the hinges and a cable 98 extends from an attachment location 99 on the edge of the door 94, across the pulley. The cable 98 extends down along one sidewall and is connected to a hand-operated winch 106. The winch is a standard crank-type winch with a ratchet mechanism. Thus, by manually cranking the winch 106, the amount of ventilation opening at the hatch opening can be controlled. Release of the ratchet mechanism will allow the cable to payout to permit the hinged door to move towards the closed position.

The above description applies to the conversion or modification of a cargo container into a firefighter training unit. In many instances, units of this general type are used to train individuals in forensic and arson investigation, as well as for actual training in fire fighting techniques. Such training is directed to determining the cause and source of a fire. As for example, the cause of a fire, whether by an accelerant, an electrical malfunction or carelessness of an individual such as from a cigarette that was not properly extinguished, can be scientifically analyzed. In each case, these fires leave distinguishing characteristics which will help the training investigator in determining the cause. In a case of use of a unit dedicated for forensic use, generally the entire interior surfaces would be lined with fireproof tiles to withstand the extreme heat and stress conditions resulting. In the case of a fire training unit, a lined burn chamber extending up to half the length will be provided. In other respects, the dedicated forensic unit is as has been described.

Multiple units can be configured in different arrangements to create larger facilities. For example, two modified units can be placed in abutting end-to-end or in an L-shaped arrangement create different physical conditions.

From the foregoing, it is apparent that the present invention provides a flexible, reliable, durable and inexpensive unit for firefighting training, for testing, for research and for investigation. The unit can be provided in several sizes and modification involving the positioning of viewing ports, doors and ventilation hatches can be customized to the requirement of the user. The high temperature ceramic viewing ports allow optimum observation.

The steel structure lined with tiles which resist heat and thermal shock provide superior durability so that the unit may be able to withstand repeated use over a long period of time.

The unit is readily mobile and can be transported by truck trailer to a training location. Mobility is achieved by loading the sea container onto a truck trailer and in conventional fashion either by using a crane or by attaching a winch to one end of the trailer and winching the unit onto a trailer.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A method of fabricating a fire training unit comprising:
    (a) providing a steel cargo container having a roof, sidewalls, end walls and a floor extending the length of the container;
    (b) cutting a port hole into at least one sidewall;
    (c) installing a transparent heat resistant window over said port;
    (d) cutting a ventilation opening in said roof;
    (e) providing a hatch over said ventilation opening, said hatch being openable to control the ventilation space;
    (f) applying heat tiles over at least a portion of the interior of the roof and sidewalls to establish a burn chamber;
    (g) securing at least one vertically extending steel post having spaced-apart sleeves to at least one of said sidewalls; and
    (h) customizing the shape of the interior of said cargo container by securing at least one panel having L-shaped hooks to one of said at least one vertical extending steel post by inserting said L-shaped hooks into said sleeves of said steel post.

2. The method of claim 1 further including the step of initially removing any combustible material from the cargo container.

3. The method of claim 1 wherein said window is slidably mounted on a frame.

4. The method of claim 1 wherein said tiles are bolted to metal framing applied to the interior walls.

5. The method of claim 4 wherein said bolts are stainless steel.

6. The method of claim 1 wherein said hatch is hinged to the roof and is openable by means of a cable extending from the hatch to a winch.

7. The method of claim 1 wherein said container is supported on beams having apertures to receive the tines of a fork lift.

8. The method of claim 1 wherein said burn chamber extends the entire length of the container.

9. The method of claim 1 wherein said burn chamber extends only part of the length of said chamber.

* * * * *